(12) United States Patent
Goma

(10) Patent No.: US 8,330,416 B2
(45) Date of Patent: Dec. 11, 2012

(54) BATTERY MODULE AND CHARGING MODULE

(75) Inventor: Shinji Goma, Shiga-ken (JP)

(73) Assignee: Murata Manufacturing Co., Ltd (JP)

( * ) Notice: Subject to any disclaimer, the term of this patent is extended or adjusted under 35 U.S.C. 154(b) by 0 days.

(21) Appl. No.: 12/509,061

(22) Filed: Jul. 24, 2009

(65) Prior Publication Data

US 2009/0284230 A1    Nov. 19, 2009

Related U.S. Application Data

(63) Continuation of application No. PCT/JP2008/069053, filed on Oct. 21, 2008.

(30) Foreign Application Priority Data

Nov. 30, 2007  (JP) .................................. 2007-311687

(51) Int. Cl.
H02J 7/00    (2006.01)

(52) U.S. Cl. .......................... 320/112; 320/107; 320/113

(58) Field of Classification Search .................. 320/112, 320/150, 107, 113, 115; 429/120, 162, 163, 429/175
See application file for complete search history.

(56) References Cited

U.S. PATENT DOCUMENTS

| | | | | |
|---|---|---|---|---|
| 6,777,910 B2 * | 8/2004 | Small | ............................. | 320/106 |
| 7,248,021 B2 * | 7/2007 | Kozu et al. | .................... | 320/147 |
| 7,733,054 B2 * | 6/2010 | Phillips et al. | ................ | 320/107 |
| 8,143,847 B2 * | 3/2012 | Kim | .............................. | 320/112 |
| 2005/0214597 A1 * | 9/2005 | Kim et al. | ......................... | 429/7 |

FOREIGN PATENT DOCUMENTS

| | | |
|---|---|---|
| JP | 2000-077831 A | 3/2000 |
| JP | 2002-319382 A | 10/2002 |
| JP | 2003-303580 A | 10/2003 |
| JP | 2004-087851 A | 3/2004 |
| JP | 2004-228044 A | 8/2004 |
| JP | 2005-174661 A | 6/2005 |

OTHER PUBLICATIONS

Hiroyuki Maeda; "International Search Report"; PCT/JP2008/069053; Jan. 20, 2009.
Hiroyuki Maeda; "Written Opinion of the International Searching Authority"; PCT/JP2008/069053; Jan. 20, 2009.
Chinese Office Action issued Mar. 3, 2011; Chinese Application No. 200880003124.8 with English translation.

* cited by examiner

*Primary Examiner* — Richard V Muralidar
(74) *Attorney, Agent, or Firm* — Studebaker & Brackett PC; Tim L. Brackett, Jr.; John F. Guay

(57) ABSTRACT

A thin and compact battery module capable of suppressing an increase in temperature of the battery in the battery module when the battery is charged. The battery module 20 includes a power circuit 21 having a heat-generating multilayer inductor 21A, a resin layer 22 in which the power circuit 21 is embedded, and a secondary cell arranged on the top face of the resin layer 22. The resin layer 22 has multiple recesses 22A in a portion that is in contact with the secondary cell 23.

17 Claims, 8 Drawing Sheets

BATTERY MODULE AND CHARGING MODULE

CROSS REFERENCE TO RELATED APPLICATIONS

The present application is a continuation of International Application No. PCT/JP2008/069053, filed Oct. 21, 2008, which claims priority to Japanese Patent Application No. JP2007-311687 filed Nov. 30, 2007, the entire contents of each of these applications being incorporated herein by reference in their entirety.

BACKGROUND OF THE INVENTION

1. Field of the Invention

The present invention relates to battery modules and charging modules. More particularly, the present invention relates to a thin battery module and a charging module capable of suppressing an increase in temperature of the battery in the battery module when the battery is being charged.

2. Description of Related Art

Secondary cells are used in electronic devices, such as mobile phones. The secondary cells can be used for a longer time through repetitive charging by chargers. For example, Japanese Unexamined Patent Application Publication No. 5-304728 describes a technology concerning a charger that charges a secondary cell. The charger includes a casing 1 on which a secondary cell 5 is detachably mounted and a charging circuit 4 included in the casing 1, as shown in FIG. 8, which illustrates an example of a charging module in related art. The charging circuit 4 includes a low heat circuit 2 and a high heat circuit 3. The low heat circuit 2 includes a noise canceling circuit and a primary rectifying circuit. The high heat circuit 3 includes an inverter circuit, a secondary rectifying circuit, and a charging control circuit.

The high heat circuit 3 is positioned farther apart from the secondary cell 5 than the low heat circuit 2. A heat insulation rib 11 vertically hanging from the top face of the casing 1 is provided between the low heat circuit 2 and the high heat circuit 3. The heat insulation rib 11 prevents air heated by the high heat circuit 3 from flowing toward the other side (i.e., lower side) of the casing 1 where the secondary cell 5 is located. Multiple air vents 10 are provided in the top and bottom faces of a portion in the casing 1, where the high heat circuit 3 is housed. The air heated by the high heat circuit 3 is externally discharged from the air vents 10. According to the above configuration, an increase in temperature of the secondary cell 5 during charging is suppressed, thus, preventing the performance of the secondary cell 5 from degrading.

However, the high heat circuit 3 is arranged at a location apart from the secondary cell in the charger disclosed in Japanese Unexamined Patent Application Publication No. 5-304728. Although it is possible to suppress an increase in temperature of the secondary cell 5 due to the high heat circuit 3 to prevent the performance of the cell from being degraded due to heat, the space in the charger is expanded because the high heat circuit 3 is spaced apart from the secondary cell 5 and, therefore, unnecessarily increases the size of the charger. In addition, since the insulation rib 11 is provided to prevent the air heated by the high heat circuit 3 from flowing from the space at the side of the high heat circuit 3 toward the secondary cell 5, there is a problem in that the structure of the casing 1 becomes complicated and, therefore, undesirably increases the manufacturing cost of the charger.

SUMMARY OF THE INVENTION

Accordingly, it is an object of the present invention to provide a thin and compact battery module and a charging module capable of suppressing an increase in temperature of the battery in the battery module when the battery is being charged.

To achieve the object described above, according to preferred embodiments of the present invention, a battery module includes a power circuit with a heat-generating circuit part, a resin layer in which the power circuit is embedded, and a cell arranged on one main face of the resin layer. The resin layer has a recess in a portion that is in contact with the cell.

In another embodiment of the battery module of the present invention, the resin layer preferably includes a plurality of recesses.

In another embodiment of the battery module of the present invention, the resin layer preferably includes a heat dissipating plate and a heat-dissipation internal electrode. The heat dissipating plate is exposed at a surface of the resin layer and is connected to the heat-generating circuit part. The heat-dissipation internal electrode is connected to the heat dissipating plate and is arranged in an area which is in the resin layer and with which the heat-generating circuit part is covered.

In another embodiment of the battery module of the present invention, the heat dissipating plate is preferably connected to the heat-dissipation internal electrode by a via hole conductor formed in the resin layer.

In another embodiment of the battery module of the present invention, a current of 1 A or higher is preferably applied to the power circuit.

A charging module of the present invention includes the battery module and a charging stand for charging a battery in the battery module. The charging stand includes a heat dissipating part.

In another embodiment of the charging module of the present invention, the heat dissipating part is preferably made of a metal.

In another embodiment of the charging module of the present invention, the heat dissipating part is preferably a Peltier element.

According to the aforementioned embodiments of present invention, it is possible to provide a thin and compact battery module and a charging module capable of suppressing an increase in temperature of the battery in the battery module when the battery is charged.

DESCRIPTION OF THE PREFERRED EMBODIMENTS

The present invention will herein be described with reference to embodiments shown in FIGS. 1 to 7.

Figure 1:
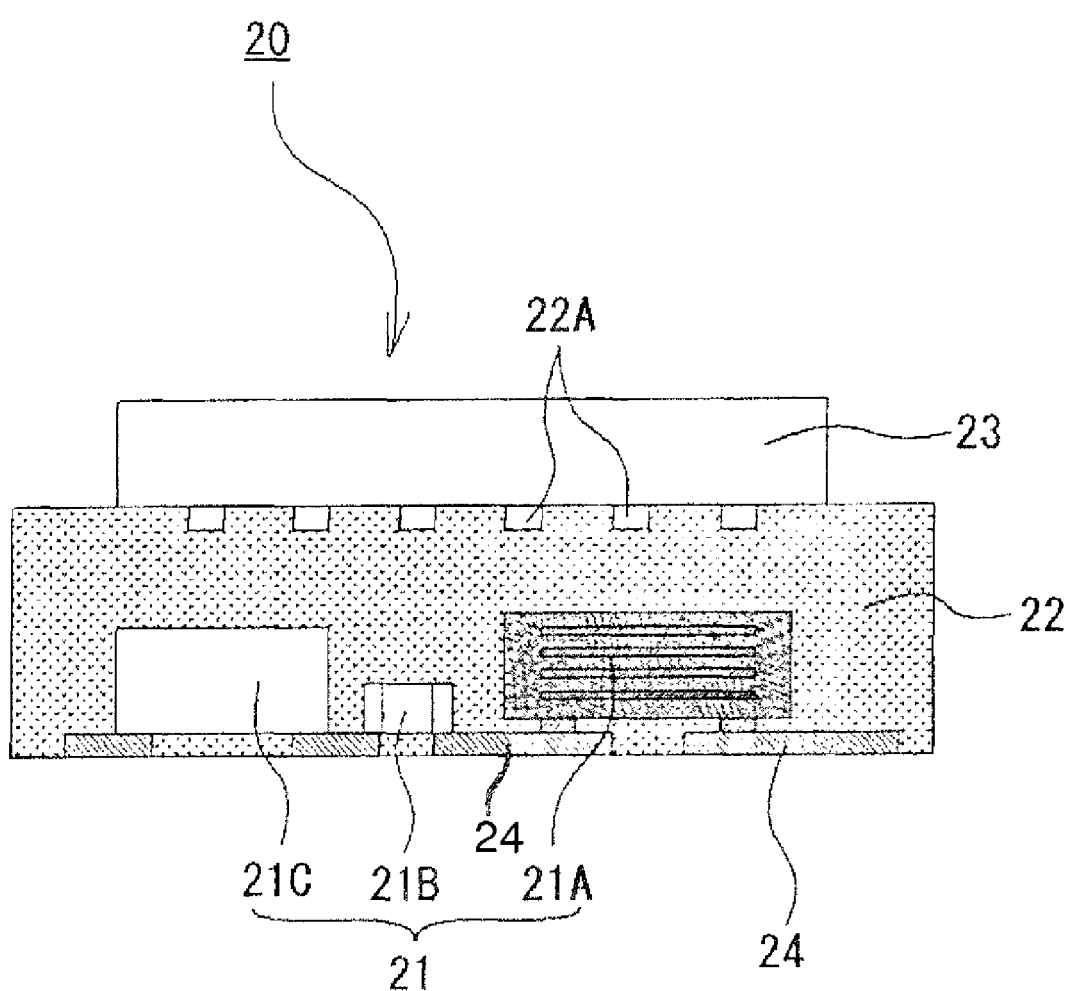
FIG. 1 is a cross-sectional view showing an embodiment of a battery module of the present invention.
Figure 3:
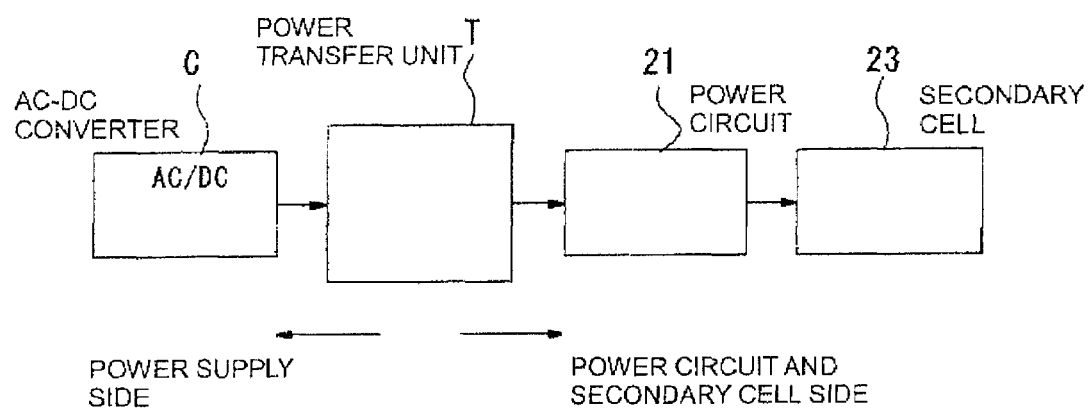
FIG. 3 is a block diagram showing the relationship between the battery module shown in FIG. 1 and a charger.

In a first embodiment, as shown in FIG. 1, a battery module 20 of the present embodiment includes, for example, a charging circuit (i.e., power circuit) 21 including a heat-generating circuit part (e.g., a multilayer inductor) 21A, a resin layer 22 in which the power circuit 21 is embedded, and a secondary cell 23, such as a lithium-ion cell, arranged on the top face of the resin layer 22. The power circuit 21 is integrated with the secondary cell 23 in the battery module 20. For example, as shown in FIG. 3, the battery module 20 is configured such that the power circuit 21 is connected to an alternate current-to-direct current (AC/DC) converter C via a power transfer unit T, such as a connector, to provide power in order to charge the secondary cell 23. The power circuit 21 is electrically connected to the secondary cell 23 located outside the resin layer 22. The power circuit 21 functions as a charging circuit during the charging of the secondary cell 23. The power circuit 21 further functions as a power circuit when the power circuit 21 is mounted in an electronic device, such as a mobile phone, to support multiple different working voltages.

The power circuit 21 includes the multilayer inductor 21A composing a DC-DC converter, a multilayer capacitor 21B, and an electronic part 21C, such as a transistor, composing a charging control circuit. The power circuit 21 is electrically connected to terminal electrodes 24 that are provided on the bottom face of the resin layer 22 in a certain pattern. For example, since the multilayer inductor 21A in the power circuit 21 has a rectification function for rectifying a ripple current and outputting the rectified ripple current to the secondary cell 23, the multilayer inductor 21A has a higher resistance and is likely to generate heat. The secondary cell 23 is integrated with the power circuit 21 with being in contact with the power circuit 21 via the resin layer 22, as shown in FIG. 1. Accordingly, the secondary cell 23 is likely to be affected by the heat generated by the power circuit 21, particularly, by the multilayer inductor 21A.

In addition, since the battery module 20 of the present embodiment is configured to apply a high current (e.g., a current of 1 to 2 A or higher) to perform the charging in a short time of, for example, minutes compared with hours in chargers in related art, the multilayer inductor 21A can generate a greater amount of heat. As a result, the secondary cell 23 can possibly experience an increased in temperature because of the effect of the heat generated by the multilayer inductor 21A which degrades the performance of the battery. Compared to the present invention, the chargers in the related art generally use a low current (e.g., a current of 0.5 A) for charging and, thus, secondary cells are less likely to be affected by the heat generated.

According to the present embodiment, as shown in FIG. 1, for example, in order to prevent or suppress an increase in temperature of the secondary cell 23 during the charging with a high current to prevent the performance of the secondary cell 23 from degrading, multiple recesses 22A are provided in the top face of the resin layer 22. These recesses 22A form a gap between the resin layer 22 and the secondary cell 23 arranged on the resin layer 22 to provide a function of blocking the heat dissipation from the power circuit 21, particularly from the multilayer inductor 21A that generates a higher heat, thus preventing an increase in temperature of the secondary cell 23 and also preventing degradation in performance of the cell.

The resin layer 22 including the power circuit 21 may be an organic resin layer made of, for example, a thermosetting resin, or a composite resin layer made of an organic resin material having a pulverized inorganic material added thereto. The resin layer 22 is preferably a composite resin layer in order to facilitate the heat dissipation from the power circuit 21. The resin layer 22 being a composite resin layer allows the heat generated by the power circuit 21 and blocked by the multiple recesses 22A to be absorbed in the resin layer 22 to be externally dissipated efficiently, thus further suppressing an increase in temperature of the secondary cell 23. Since the terminal electrodes 24 are provided on the bottom face of the resin layer 22 and exposed at the bottom face of the resin layer 22, the terminal electrodes 24 function as heat dissipating plates to further efficiently dissipate the heat in the resin layer 22.

The battery module 20 of the present embodiment can be generally manufactured by, for example, a manufacturing process shown in FIGS. 2(a) to 2(e). First, as shown in FIG. 2(a), a substrate 100 made of, for example, stainless steel is prepared and a copper foil or the like is pasted on the top face of the stainless-steel substrate 100 to form the terminal electrodes 24 in a certain pattern by an etching technology. Then, after the multilayer inductor 21A, the multilayer capacitor 21B, and the electronic part 21C are mounted on the terminal electrodes 24, as shown in FIGS. 2(b) and 2(c), a partially hydrogenated composite resin 122 is thermally compression-bonded to the substrate 100 to embed the power circuit 21 in the composite resin 122, as shown in FIG. 2(d). Then, after a gold foil or the like having projections formed in a certain pattern on its bottom face is pressed on the top face of the composite resin 122 to form the multiple recesses 22A arranged in a certain pattern, as shown in FIG. 2(e), the composite resin 122 is cured at a predetermined temperature to form the resin layer 22. Then, after the secondary cell 23 is adhered to the top face of the resin layer 22 with an adhesive to fix the secondary cell 23 on the resin layer 22, the substrate 100 is peeled off from the resin layer 22 to manufacture the battery module 20 shown in FIG. 1. The battery module 20 can be produced by concurrently manufacturing multiple battery modules 20 by using a parent substrate capable of having multiple secondary cells 23 arranged thereon and cutting out the individual battery modules 20 on the parent substrate.

As described above, the battery module 20 of the present embodiment includes the power circuit 21 having the heat-generating multilayer inductor 21A, the resin layer 22 with the power circuit 21 embedded therein, and the secondary cell 23 arranged on the top face of the resin layer 22. Since the resin layer 22 has the multiple recesses 22A in the face that is in contact with the secondary cell 23, the gap composed of the multiple recesses 22A is provided between the top face of the resin layer 22 and the bottom face of the secondary cell 23. As a result, since the secondary cell 23 is thermally blocked from the side of the resin layer 22 by the gap composed of the multiple recesses 22A, an increase in temperature of the secondary cell 23 can be prevented, even if the secondary cell 23 is quickly charged with a current of 2 A or higher which increases the amount of the heat generated in the power circuit 21, particularly in the multilayer inductor 21A. Consequently, it is possible to prevent degradation in performance of the secondary cell 23 and to increase the lifetime of the secondary cell 23.

In addition, since the multiple recesses 22A can be easily formed in the resin layer 22, the battery module 20 can be manufactured at a low cost. Furthermore, since the power circuit 21 is composed of the multilayer inductor 21A, the multilayer capacitor 21B, and the electronic part 21C, such as a transistor, it is possible to decrease the thickness and size of the entire battery module 20.

Figure 4:
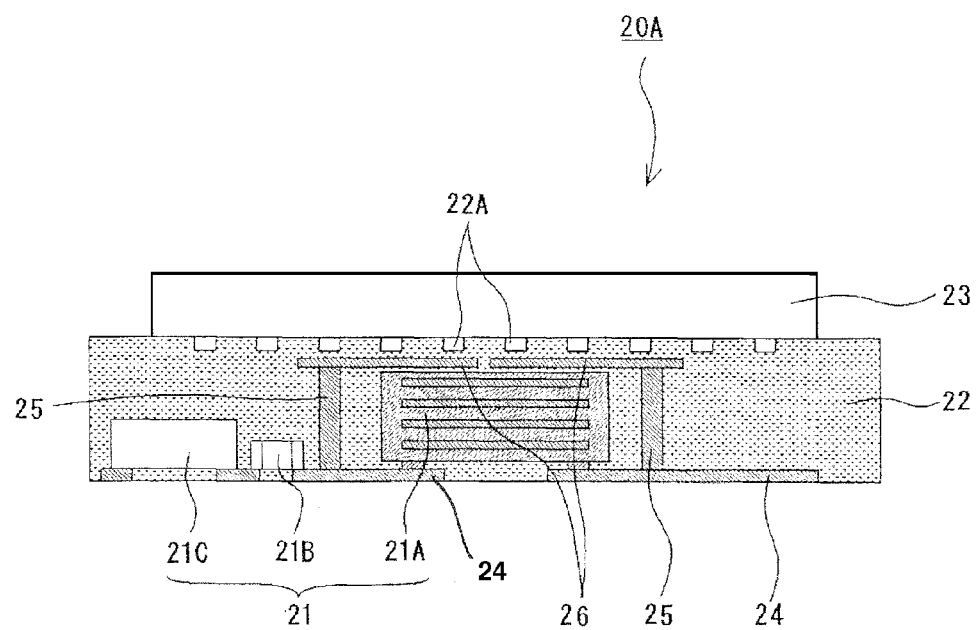
FIG. 4 is a cross-sectional view showing another embodiment of the battery module of the present invention.

In a second embodiment of the present invention, as shown in FIG. 4, a battery module 20A is characterized in that means for facilitating the heat dissipation from the battery module 20 of the first embodiment is added to module 20A. Accordingly, the same reference numerals are used in the present embodiment to identify the same or corresponding parts in the first embodiment.

Specifically, according to the present embodiment, via hole conductors 25 are formed on the left and right terminal electrodes 24, to which the multilayer inductor 21A composing the power circuit 21 is connected, as shown in FIG. 4. The via hole conductors 25 are arranged on both the left and right sides of the multilayer inductor 21A. The via hole conductors 25 stand on the respective terminal electrodes 24 and are positioned relatively apart from the multilayer inductor 21A. The top ends of the via hole conductors 25 are slightly higher than the top face of the multilayer inductor 21A. Heat-dissipation internal electrodes 26 are provided on the top ends of the left and right via hole conductors 25. The heat-dissipation internal electrodes 26 horizontally extend from the respective via hole conductors 25 toward the inside of the multilayer inductor 21A. The top face of the multilayer inductor 21A is covered with the heat-dissipation internal electrodes 26, which absorb the heat dissipated from the multilayer inductor 21A.

The extending ends of the left and right heat-dissipation internal electrodes 26 are opposed to each other with a small gap therebetween. The via hole conductors 25 and the heat-dissipation internal electrodes 26 are embedded in the resin layer 22, as shown in FIG. 4. The terminal electrodes 24 are exposed at the bottom face of the resin layer 22, as shown in FIG. 4, and also function as heat dissipation plates, as in the first embodiment. Each of the terminal electrodes 24, the via hole conductors 25, and the heat-dissipation internal electrodes 26 is preferably made of a highly conductive metal material, such as silver, copper, gold, or aluminum.

A connection of the battery module 20A of the present embodiment to the AD-DC converter C via the power transfer unit T, such as a connector, as shown in FIG. 3, to charge the battery module 20A allows the heat generated by the multilayer inductor 21A in the power circuit 21 and dissipated from the multilayer inductor 21A to be absorbed by the heat-dissipation internal electrodes 26. The heat is then efficiently dissipated from the resin layer 22 via the heat-dissipation internal electrodes 26, the via hole conductors 25, and the terminal electrodes 24 (i.e., heat dissipating plates). This configuration prevents an increase in temperature of the secondary cell 23 and, thus does not cause degradation in performance of the cell.

Figure 2:
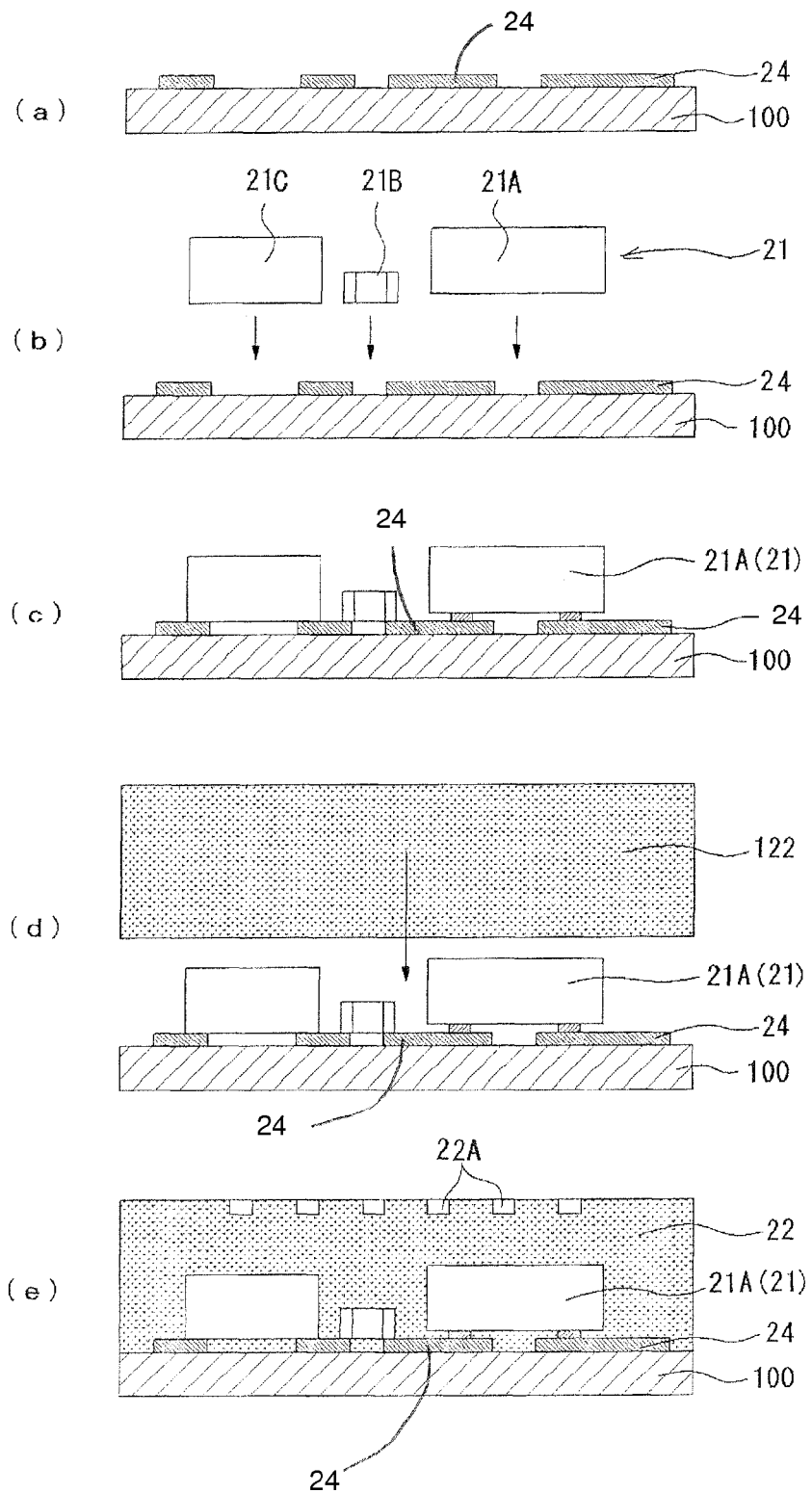
FIGS. 2(*a*), 2(*b*), 2(*c*), 2(*d*), and 2(*e*) are cross-sectional views illustrating the main parts in a manufacturing process of the battery module shown in FIG. 1.

The battery module 20A of the present embodiment can be manufactured by a process similar to the one shown in FIG. 2. However, the heat-dissipation internal electrodes 26 are provided in the present embodiment, and the resin layer 22 is formed in at least two steps, instead of one step. In a first stage, after the power circuit 21 including the multilayer inductor 21A is embedded in a composite resin, via holes are formed at both sides of the multilayer inductor 21A by a laser or the like and are filled with a conductive resin to from the via hole conductors 25. After a copper foil or the like is pasted on the top face of the composite resin formed in the first stage to connect the copper foil with the heat-dissipation internal electrodes 26, the heat-dissipation internal electrodes 26 in a certain pattern is formed by an etching technology. Then, in a second stage, the remaining composite resin is applied to coat the heat-dissipation internal electrodes 26 with the composite resin, thereby finally forming the resin layer 22.

As described above, according to the present embodiment, the via hole conductors 25, the heat-dissipation internal electrodes 26, and the terminal electrodes 24 are provided in the resin layer 22 so as to surround the multilayer inductor 21A. Accordingly, the via hole conductors 25, the heat-dissipation internal electrodes 26, and the terminal electrodes 24 allow the heat generated by the multilayer inductor 21A to be efficiently dissipated from the resin layer 22 to further suppress an increase in temperature of the secondary cell 23, compared with the battery module 20A of the first embodiment. Consequently, it is possible to more reliably prevent degradation in performance of the secondary cell 23 to greatly increase the lifetime of the secondary cell 23. In addition, it is possible to achieve a decrease in thickness and size of the battery module 20A, as in the first embodiment.

Figure 5:
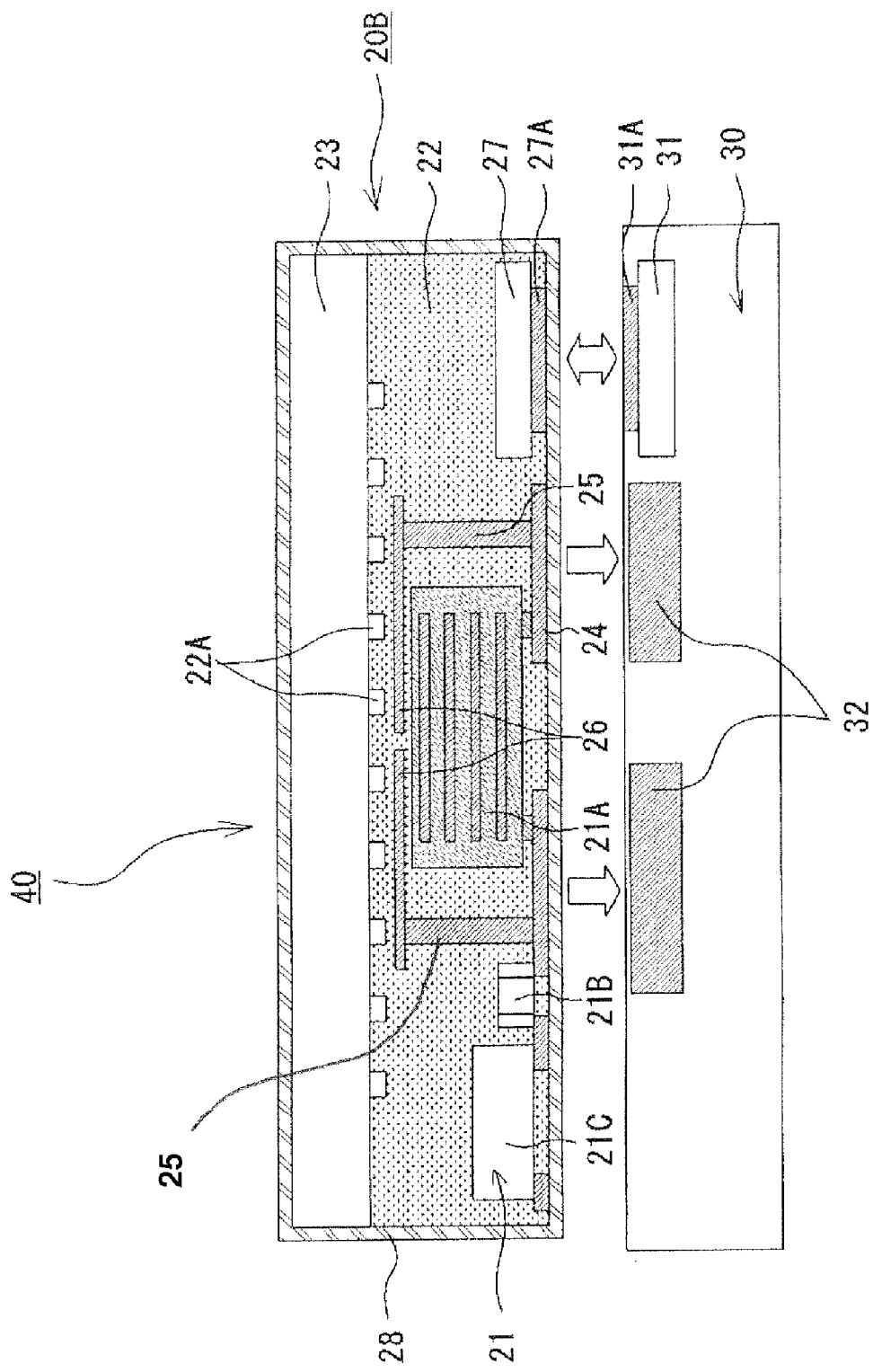
FIG. 5 is a cross-sectional view showing an embodiment of a charging module of the present invention.

In a third embodiment of the present invention, a battery module 20B is integrated with a charging stand 30, for example, in a manner shown in FIG. 5 to form a charging module 40 of the present embodiment. Since the battery module 20B with the charging module 40 of the present embodiment has a basic structure similar to that of the second embodiment, the same reference numerals are used in the charging module of the present invention to identify the same or corresponding parts in the second embodiment.

The charging module 40 of the present embodiment includes the battery module 20B and the charging stand 30, as shown in FIG. 5. The charging module 40 is configured such that the battery module 20B is opposed to and is substantially in parallel with the charging stand 30 in a non-contact manner to charge the secondary cell 23 in the battery module 20B with power from the charging stand 30. During use, the charging stand 30 is connected to an AC-DC converter (not shown). The charging stand 30 includes a primary-side coil module 31 for power transmission, and the battery module 20B includes a secondary-side coil module 27 for power reception, as shown in FIG. 5. The battery module 20B has a structure similar to that of the battery module 20A with some differences. Particularly, in the battery module 20B, the secondary-side coil module 27 is added in the resin layer 22 of the battery module 20A of the second embodiment, and the resin layer 22 including the power circuit 21, and the secondary cell 23 is covered with a casing 28 and is in close contact with the casing 28, as shown in FIG. 5.

The primary-side coil module 31 is arranged so that a coil 31A is exposed at the top face of the charging stand 30. The secondary-side coil module 27 is arranged so that a coil 27A is exposed at the bottom face of the resin layer 22. In the coil modules 31 and 27, the respective coils 31A and 27A are thin plate coils. Accordingly, the secondary-side coil module 27 can be accommodated and embedded in the resin layer 22.

As described above, the charging stand 30 includes the primary-side coil module 31, and the battery module 20B includes the secondary-side coil module 27, which forms a pair with the primary-side coil module 31. Accordingly, when the battery module 20B is held over the charging stand 30 in a state where power is supplied to the charging stand 30 via the AC-DC converter, the primary-side coil module 31 is magnetically coupled to the secondary-side coil module 27 to transfer the power from the primary-side coil module 31 to the secondary-side coil module 27 by electromagnetic induction, which generates a voltage in the secondary-side coil module 27 with an alternating-current magnetic field generated in the primary-side coil module 31. Thus, the primary-side coil module 31 and the secondary-side coil module 27 form the power transfer unit T, as shown in FIG. 3, in the present embodiment.

In the battery module 20B, the voltage generated in the secondary-side coil module 27 is converted into a ripple current through the power circuit 21, the ripple current is rectified as a direct current in the multilayer inductor 21A, and the secondary cell 23 is charged with a current of a certain value.

Consequently, when the battery module 20B is positioned over the charging stand 30 connected to the AD-DC converter C, as shown in FIG. 3, to charge the secondary cell 23 in a non-contact manner, the heat generated in the multilayer inductor 21A in the power circuit 21 and absorbed by the heat-dissipation internal electrodes 26 is externally dissipated from the bottom face of the battery module 20B through the via hole conductors 25 and the terminal electrodes 24, as shown by large arrows in FIG. 5.

According to the present embodiment, multiple heat dissipating parts 32, which are, e.g., highly conductive discharging metals made of, for example, silver or copper, are provided in the charging stand 30 in dispersed locations. These discharging metals 32 absorb the heat dissipated from the battery module 20B. Since the charging stand 30 is generally larger than the battery module 20B and the thermal capacity of the heat-dissipation parts 32 are relatively high, the heat from the battery module 20B can be absorbed. This facilitates the heat dissipation from the battery module 20B.

As an additional structure for dissipating the heat of the heat-dissipation parts 32 in the charging stand 30 to the outside of the charging module 40, the heat from the battery module 20B may be dissipated from the charging stand 30 through the discharging metals 32.

As described above, according to the present embodiment, the charging stand 30 includes the heat-dissipation parts 32 in the charging module 40 including the battery module 20B and the charging stand 30. Accordingly, when the battery module 20B is held over the charging stand 30, a current of 2 A or higher is applied from the charging stand 30 to the secondary cell 23 in the battery module 20B in a non-contact manner to quickly charge the battery module 20B, and the heat generated in the battery module 20B is dissipated toward the charging stand 30. The heat dissipation from the battery module 20B can be facilitated because the heat from the battery module 20B is absorbed by the heat-dissipation parts 32 in the charging stand 30. Accordingly, it is possible to prevent the heat storage in the resin layer 22 in the battery module 20B. In addition, since the heat from the resin layer 22 is blocked by the gap formed of the multiple recesses 22A, it is possible to suppress an increase in temperature of the secondary cell 23 and, thus prevents the degradation in performance of the cell. The similar effects and advantages as in the second embodiment can be expected in the present embodiment.

Figure 6:
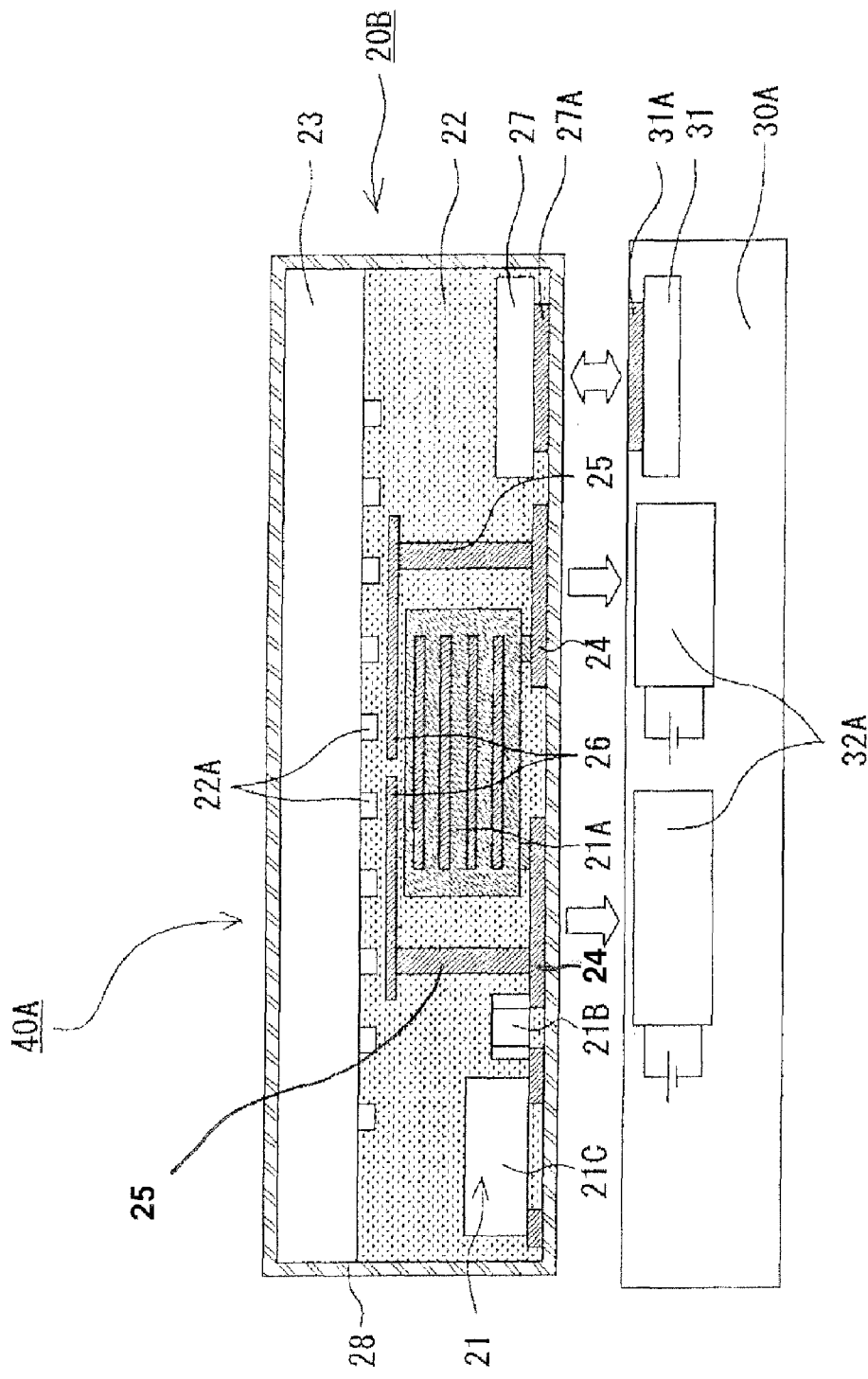
FIG. 6 is a cross-sectional view showing another embodiment of the charging module of the present invention.

A charging module 40A of the present embodiment according to a fourth embodiment of the present invention has a structure similar to that of the third embodiment except the structure of a charging stand 30A, for example, as shown in FIG. 6. Accordingly, the same reference numerals are used in the charging module of the present invention to identify the same or corresponding parts in the third embodiment.

As shown in FIG. 6, the charging stand 30A according to the present embodiment includes Peltier elements 32A as heat dissipating parts, instead of the heat-dissipation parts 32 in the charging stand 30 according to the third embodiment. Since the charging stand 30A is cooled down by the Peltier elements 32A, the space between the charging stand 30A and the battery module 20B can be cooled down to increase the difference in temperature between the space and the battery module 20B, thus facilitating the heat dissipation from the battery module 20B. As a result, it is possible to more reliably prevent an increase in temperature of the secondary cell 23, and to more reliably prevent degradation in performance of the cell. The similar effects and advantages as in the third embodiment can be expected in the present embodiment.

Accordingly, since the charging stand 30A includes the Peltier element 32A, the charging stand 30A is cooled down by the Peltier element 32A to facilitate the heat dissipation from the battery module 20B. As a result, it is possible to further suppress an increase in temperature of the battery module 20B to further prevent an increase in temperature of the secondary cell 23.

Since the power circuit 21 is integrated with the secondary cell 23 via the resin layer 22 in the battery modules 20, 20A, and 20B of the above embodiments, the power circuit 21 can be mounted on the terminal electrodes 24 on the bottom face opposing the face on which the secondary cell 23 is provided. Accordingly, the power circuit 21, particularly, the high-heat multilayer inductor 21A, can be separated from the secondary cell 23 to provide the multiple recesses 22A in the top face of the resin layer 22.

Figure 7:
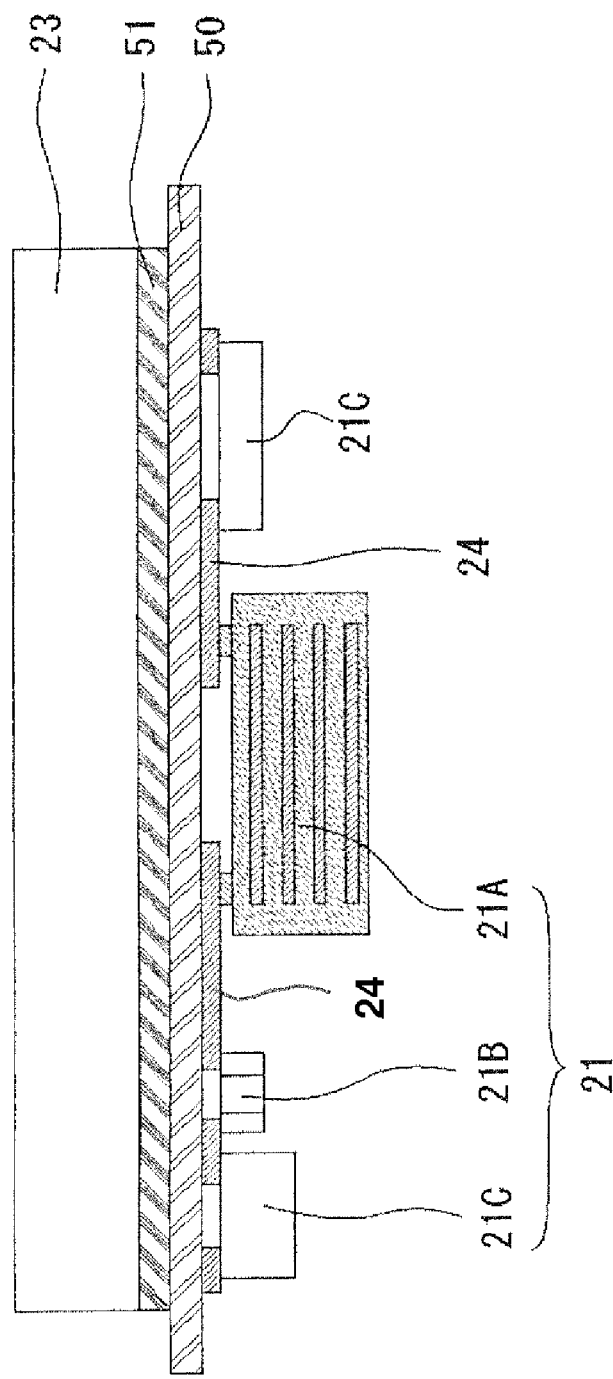
FIG. 7 is a cross-sectional view showing a reference example of a battery module.
Figure 8:
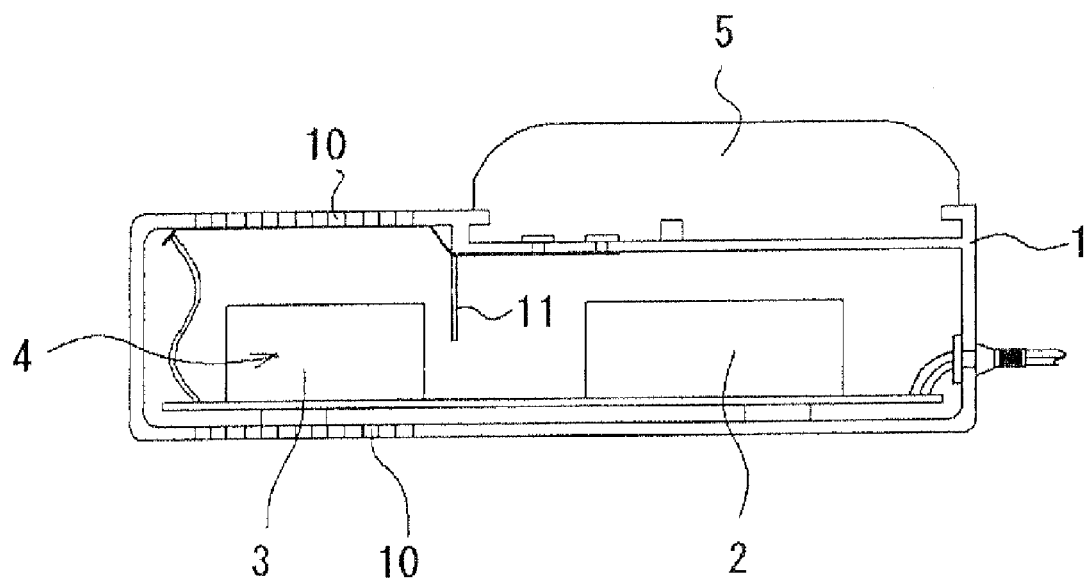
FIG. 8 is a cross-sectional view showing an example of a charging module in related art.

In contrast, for example, when the power circuit 21 is mounted on a printed circuit board 50 and the power circuit 21 is integrated with the secondary cell 23 via the printed circuit board 50, as shown in FIG. 7, it is necessary to mount the secondary cell 23 on a face of the printed circuit board 50 where no other component is mounted. In this case, since the heat generated in the multilayer inductor 21A is directly transferred from the printed circuit board 50, the temperature of the secondary cell 23 is likely to increase. Accordingly, as a heat blocking measure, a heat insulating sheet 51 is provided between the printed circuit board 50 and the secondary cell 23, as shown in FIG. 7. However, although the heat insulating sheet 51 serves to suppress an increase in temperature of the secondary cell 23, the thickness of the entire battery module is larger than that of the battery module of the present embodiment because the heat insulating sheet 51 is provided between the printed circuit board 50 and the secondary cell 23. In addition, the manufacturing cost is also increased because of the provision of the heat insulating sheet 51.

Examples of the above-mentioned embodiments are provided below. In Example 1, the battery module 20A shown in FIG. 4 was manufactured by using the secondary cell (e.g., a lithium ion cell) 23 having a thickness of 5 mm and a capacity of 800 mAh. The entire battery module 20A including the resin layer 22 incorporating the power circuit 21 and the secondary cell 23 had a thickness of 8.5 mm. When the secondary cell 23 in the battery module 20A was charged with a current of 3 A, the temperature of the resin layer 22 including the charged power circuit 21 was increased up to 55° C. In contrast, the temperature of the secondary cell 23 was 45° C. at maximum.

As a reference example, the battery module shown in FIG. 7 was manufactured. The entire battery module including the printed circuit board 50 on which the power circuit 21 is mounted, the heat insulating sheet 51, and the secondary cell 23 had a thickness of 10 mm at minimum. When the secondary cell 23 in this battery module was charged with a current of 3 A, as in Example 1, the temperature of the secondary cell 23 was increased to 53° C.

As the result of the above examples, the battery module 20A of Example 1 was decreased in thickness by 1.5 mm, compared with the battery module in the reference example, and the increase in temperature of the secondary cell 23 due to the charging was decreased by 8° C. Accordingly, the provision of the multiple recesses 22A in the top face of the resin layer 22 and the provision of the terminal electrodes 24 and the heat-dissipation internal electrodes 26 in the resin layer 22, as in Example 1, allow the heat transfer toward the secondary cell 23 to be suppressed, even when the heat is generated in the power circuit 21, particularly in the multilayer inductor 21A, increases the temperature of the resin layer 22 to 55° C. As a result, the heat is mainly dissipated from the bottom face of the resin layer 22 to suppress an increase in temperature of the secondary cell 23.

In an Example 2, the battery module 20B shown in FIG. 5 was manufactured by using the secondary cell (e.g., a lithium ion cell) 23 having a thickness of 5 mm and a capacity of 800 mAh. Since the battery module 20B results from only the addition of the secondary-side coil module 27 in the battery module 20 in Example 1, the entire battery module 20B including the resin layer 22 incorporating the power circuit 21 and the secondary cell 23 had a thickness of 8.5 mm, as in Example 1. When the secondary cell 23 in the battery module 20B was charged with a current of 3 A in a non-contact manner with the charging stand 30, the temperature of the resin layer 22 including the charged power circuit 21 was increased up to 55° C. In contrast, the temperature of the secondary cell 23 was 42° C. at maximum.

As a reference example, a battery module resulting from addition of the secondary-side coil module in the battery module shown in FIG. 7 was manufactured to allow the charging in a non-contact manner with the charging stand. In this case, the charging stand without the heat-dissipation parts was used. When the secondary cell 23 in this battery module was charged with a current of 3 A with the charging stand, as in Example 1, the temperature of the secondary cell 23 was increased to 53° C.

As the result of the above examples, the battery module 20B of Example 2 was decreased in thickness by 1.5 mm, compared with the battery module in the reference example, as in Example 1. In addition, the increase in temperature of the secondary cell 23 due to the charging was decreased by as much as 11° C. Accordingly, the increase in temperature of the secondary cell 23 was further decreased by about 3° C., compared with Example 1 without using the charging stand 30. This shows that the provision of the heat-dissipation parts 32 in the charging stand 30 allows the increase in temperature of the secondary cell 23 to be further decreased by 3° C.

The present invention is not restricted by the above embodiments. For example, although the multiple recesses 22A are provided in the above embodiments, the multiple recesses may not be provided.

Further, although the multilayer inductor is exemplified as the heat generating part in the above embodiments, the heat generating part is not restricted to the multilayer inductor. For example, the heat generating part may be any heat generating part, such as a transistor, a thin film transistor (TFT), or an integrated circuit (IC), made of semiconductor or the like. When multiple resin layers including the power circuit are provided, the heat-dissipation internal electrodes may be provided in each resin layer. When the heat-dissipation electrodes are provided in the multiple layers, the heat-dissipation internal electrodes are preferably connected to each other by via hole conductors.

The present invention is preferably applicable to battery modules and charging modules in various electronic devices, such as mobile phones.

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:

1. A battery module, comprising:
 a power circuit including a heat-generating circuit part;
 a resin layer in which the power circuit is embedded; and
 a battery cell disposed on one main face of the resin layer, the battery cell including a first main surface, a second main surface facing the first main surface, and side surfaces connecting the first and second main surfaces,
 wherein dimensions of the first and second main surfaces are greater than that of the side surfaces, and substantially the entire first main surface of the battery cell covers a portion of the resin layer and forms an interface with said portion, and said portion includes a recess extending into the resin layer from the interface.

2. The battery module according to claim 1,
 wherein the resin layer includes a plurality of recesses.

3. The battery module according to claim 1,
 wherein the resin layer includes a heat dissipating plate and a heat-dissipation internal electrode, the heat dissipating plate being exposed at a surface of the resin layer and connected to the heat-generating circuit part, the heat-dissipation internal electrode being connected to the heat dissipating plate and disposed in the resin layer in the vicinity of the heat-generating circuit part.

4. The battery module according to claim 3,
 wherein the heat dissipating plate is connected to the heat-dissipation internal electrode by a via hole conductor formed in the resin layer.

5. The battery module according to claim 1,
 wherein the power circuit is capable of providing a charging current of 1 A or higher.

6. A charging module, comprising:
 a battery module including:
  a power circuit including a heat-generating circuit part;
  a resin layer in which the power circuit is embedded; and
  a battery cell disposed on one main face of the resin layer, the battery cell including a first main surface, a second main surface facing the first main surface, and side surfaces connecting the first and second main surfaces,
  wherein dimensions of the first and second main surfaces are greater than that of the side surfaces, and substantially the entire first main surface of the battery cell covers a portion of the resin layer and forms an interface with said portion, and said portion includes a recess extending into the resin layer from the interface; and
 a charging stand charging the battery cell in the battery module, wherein the charging stand includes a heat dissipating part.

7. The charging module according to claim 6,
 wherein the heat dissipating part is made of a metal.

8. The charging module according to claim 6,
 wherein the heat dissipating part is a Peltier element.

9. The charging module according to claim 6, wherein the resin layer includes a heat dissipating plate and a heat-dissipation internal electrode, the heat dissipating plate being exposed at a surface of the resin layer and connected to the heat-generating circuit part, the heat-dissipation internal electrode being connected to the heat dissipating plate and disposed in the resin layer and in the vicinity of the heat-generating circuit part.

10. The charging module according to claim 9, wherein the heat dissipating plate is connected to the heat-dissipation internal electrode by a via hole conductor formed in the resin layer.

11. The charging module according to claim 10, wherein the power circuit is capable of providing a charging current of 1 A or higher.

12. The charging module according to claim 9, wherein the power circuit is capable of providing a charging current of 1 A or higher.

13. The charging module according to claim 6, wherein the power circuit is capable of providing a charging current of 1 A or higher.

14. The charging module according to claim 6, wherein the resin layer comprises a plurality of recesses.

15. The charging module according to claim 14, wherein the resin layer includes a heat dissipating plate and a heat-dissipation internal electrode, the heat dissipating plate being exposed at a surface of the resin layer and connected to the heat-generating circuit part, the heat-dissipation internal electrode being connected to the heat dissipating plate and disposed in the resin layer in the vicinity of the heat-generating circuit part.

16. The charging module according to claim 15, wherein the heat dissipating plate is connected to the heat-dissipation internal electrode by a via hole conductor formed in the resin layer.

17. The charging module according to claim 16, wherein the power circuit is capable of providing a charging current of 1 A or higher.

* * * * *